United States Patent [19]

Yang

[11] Patent Number: 5,483,433
[45] Date of Patent: Jan. 9, 1996

[54] VOLTAGE CONTROL CIRCUIT FOR A MULTIPLE STAGE DC POWER SUPPLY, AND APPLICATIONS THEREOF

[76] Inventor: Tai-Her Yang, 5-1 Taipin St. Si-Hu Town, Dzan-Hwa, Taiwan

[21] Appl. No.: 354,771

[22] Filed: Dec. 12, 1994

Related U.S. Application Data

[63] Continuation of Ser. No. 104,625, Aug. 11, 1993, abandoned.

[30] Foreign Application Priority Data

Aug. 18, 1993 [GB] United Kingdom ............ 9218408

[51] Int. Cl.$^6$ .................................................. H02M 1/14
[52] U.S. Cl. .................... 363/43; 307/37; 307/71
[58] Field of Search .......................... 307/71, 60, 37, 307/43, 49; 363/43, 59, 74, 78

[56] References Cited

U.S. PATENT DOCUMENTS

| | | | |
|---|---|---|---|
| 4,412,137 | 10/1983 | Hansen et al. | 307/10 R |
| 4,788,452 | 11/1988 | Stanley | 307/71 |
| 4,814,631 | 3/1989 | Jackson | 307/53 |
| 5,352,931 | 10/1994 | Yang | 307/81 |

FOREIGN PATENT DOCUMENTS

| | | | |
|---|---|---|---|
| 197239 | 7/1965 | Sweden | 307/71 |

*Primary Examiner*—Peter S. Wong
*Assistant Examiner*—Adolf Berhane
*Attorney, Agent, or Firm*—Bacon & Thomas

[57] ABSTRACT

A voltage controller capable of generating a staircase voltage is made up of a plurality of energy storage devices series connected with respective solid state switch devices. The solid state switch devices can be turned on or off to connect different combinations of the batteries in series with the output of the controller, the voltage output being proportional to the number of batteries connected in series in any particular combination. By cycling between different switch combinations, and reversing the polarity of the output once every cycle, an approximated sine wave output can be obtained. By providing a voltage input, the device can also function as a voltage converter or transformer-like device. Individual steps can be pulse width modulated simply by controlling the switch combinations, and by adding a linear switch device at the input, analog modulation of the step voltages can be obtained.

11 Claims, 8 Drawing Sheets

5,483,433

VOLTAGE CONTROL CIRCUIT FOR A MULTIPLE STAGE DC POWER SUPPLY, AND APPLICATIONS THEREOF

This application is a Continuation of application Ser. No. 08/104,625, filed Aug. 11, 1993, now abandoned.

SUMMARY OF THE INVENTION

Since sets of more than one battery or other power storage element are convenient for handling, they are widely used for various kinds of appliances, such as electric loaders, etc. In general, however, each kind of storage device, whether the source is chemical, thermal, or solar, has an intrinsic voltage which must be converted to a desired voltage by means of a series or parallel connection in order to meet the demands of the load, for example by converting the storage device output to a stepped voltage, by controlling a serial linear element, or by operation of rectifier switches.

The present invention relates to a staircase voltage output control circuit for a battery set, other power storage device, or independent DC power supplies, and further to a stepped voltage power supply with linear voltage adjustment obtained by means of a solid state linear element or rectifying solid state switch device having a linear output, in which the rectifying solid state switch device is series connected between the voltage switching points of a modulated staircase voltage output made up of the battery set and diodes, in order to form a voltage regulator for various stepped voltages. Regulation is obtained by modulating the output by virtue of a solid state circuit in which a lower voltage is taken as a negative wave peak and the next higher voltage as the positive peak value in order to easily modulate the steps. The waveform shaping of the invention can be applied to an inverter to obtain an approximated sine wave, for DC waveform adjustment, or to obtain a DC-to-DC switch type transformer output.

DETAILED DESCRIPTION OF THE INVENTION

Figure 1:
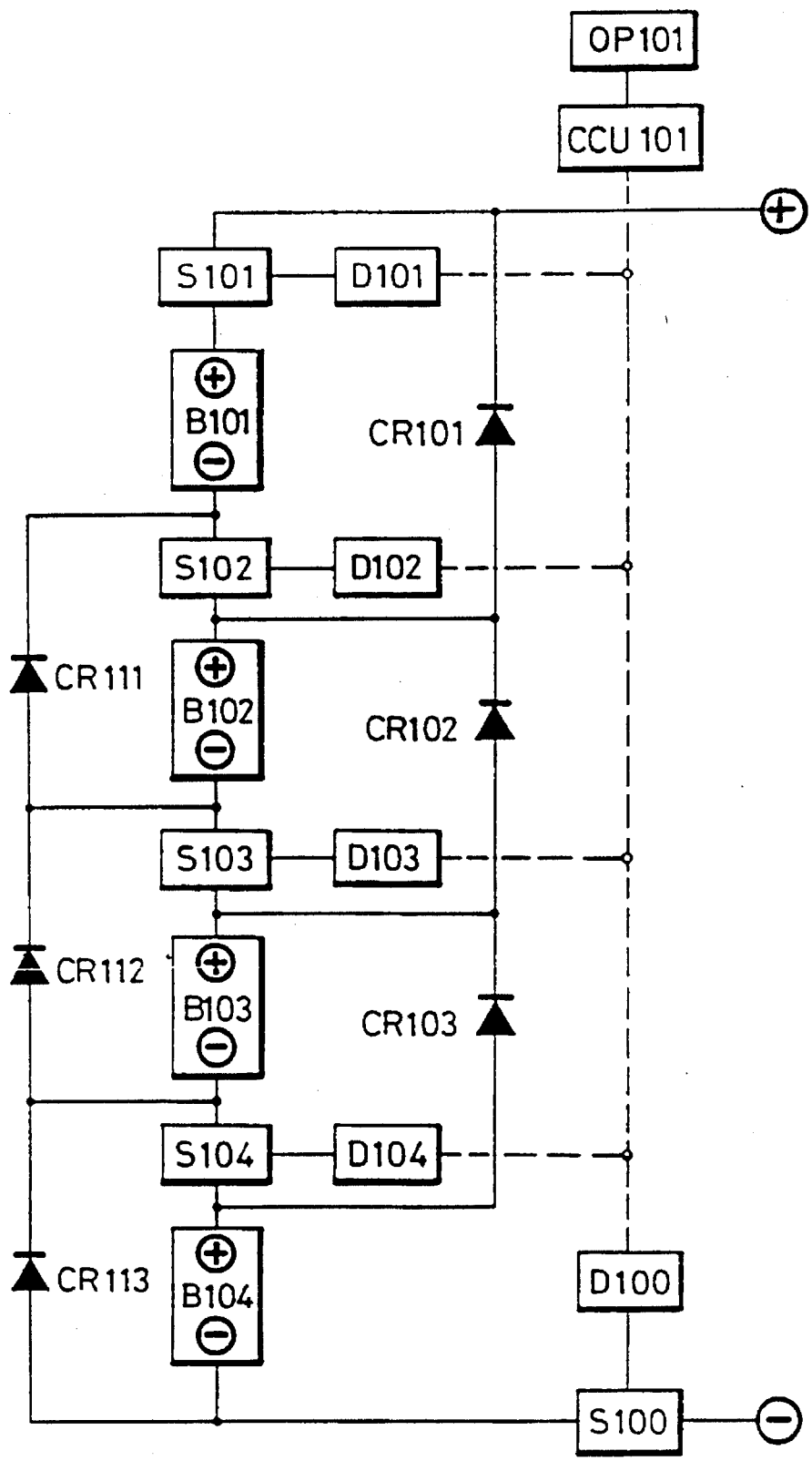
FIG. 1 is a block diagram showing the basic circuit of the present invention.

FIG. 1 is a block diagram showing the basic circuit of the present invention, including four energy storage devices B101–B104 and four solid state switch devices S101–S104 connected in series. Those skilled in the art will appreciate that the number of energy storage devices and solid state switch devices may be varied, although, at least three each of the energy storage devices and the solid state switch devices are preferred.

Solid state switch device S100, which is connected series with the output end serves as the general switch for the basic circuit, providing either linear voltage regulation from zero to the lowest voltage or PWM voltage regulation.

Each solid state switch device is connected to a respective drive circuit D 100, D101, D102, D103, D104 controlled by a digital logic type or analog type controller CCU101 in order to operate the respective solid state switch devices S101–S104.

An operation interface OP101 is driven by manual control or by an electric signal in order to cause CCU101 to send an operation signal to the drive circuits D101–D104 associated with each switch device S101–S104.

Energy storage devices B101, B102, B103, and B104 are connected to diodes CR101, CR102, and CR103 as follows: one terminal of each of diodes CR101, CR102, and CR103 is respectively connected to a positive pole of one of energy storage devices B101, B102, and B103, diodes CR101, CR102, and CR103 in turn being connected in series with each other and having a polarity which enables positive current to flow from the positive pole of each energy storage device and to the positive output end of the basic circuit.

Energy storage devices B101, B102, B103, and B104 are connected to diodes CR111, CR112, and CR113 as follows: one terminal of each of diodes CR111, CR112, and CR113 is respectively connected to a negative pole of one of energy storage devices B101, B102, and B103, diodes CR101, CR102, and CR103 in turn being connected in series with each other and having a polarity which enables negative current from each energy storage device to flow to the negative output end of the basic circuit. As a result, the series combinations of energy storage devices B102, B103, and B104 and respective switches S102, S103, and S104 are respectively parallel connected to diodes CR111, CR112, and CR113, and the series combinations of energy storage devices B101, B102, and B103 and respective switches S101, S102, and S103 are respectively parallel connected to diodes CR101, CR102, and CR103.

The following operations and controls can be accomplished by means of the above-described circuit, in which four energy storage devices can be controlled to provide an output ranging from zero to a maximum voltage in any of the following formats:

A. Staircase signal generation;

B. Partial output of the staircase steps;

C. Pulse width modulation of the staircase voltage or a linear output;

D. Analog modulation of the staircase voltage for a linear output;

E. Partial continuous output.

The operations and controls are described in detail as follows:

A. To obtain the basic staircase voltage output, the following four steps are carried out:

(1) All energy storage devices B101–B104 are connected in parallel with the output and each solid state switch device S101–S104 is switched OFF, while the solid state switch device S100 is switched ON, as shown in Table 1:

TABLE 1

| Switch Device | S101 | S102 | S103 | S104 | S100 |
|---|---|---|---|---|---|
| Work Status | OFF | OFF | OFF | OFF | ON |

In this condition, if the voltage of each independent energy storage device shown in FIG. 1 is E, then the output voltage is also E because the storage devices are all connected in parallel.

(2) Each possible combination of two energy storage devices series is connected as a set and then parallel connected to one another, or half the total number of possible battery sets are parallel connected and then series connected with the other half to increase output voltage by two-fold compared to (1), by causing respective solid state switch devices S101–S104 to switch ON either as shown in Table 2A or Table 2B (i.e., by either parallel connecting two sets of series connected storage devices or by series connecting two sets of parallel connected storage devices):

TABLE 2A

| Switch Device | S101 | S102 | S103 | S104 | S100 |
|---|---|---|---|---|---|
| Work Status | ON | ON | OFF | ON | ON |

TABLE 2B

| Switch Device | S101 | S102 | S103 | S104 | S100 |
|---|---|---|---|---|---|
| Work Status | ON | OFF | ON | OFF | ON |

In either case, if the voltage of each independent energy storage device is E then the output voltage is 2E.

(3) Each possible combination of three units in series is connected in turn as one set to increase the output voltage by three-fold compared to (1), the operating sequences for the solid state switch device being cycled between energy storage devices as shown in Tables 3A–3D, in order to distribute the output load to each energy storage device evenly. If the voltage of each a dependent energy storage device is E, then the output voltage is 3E.

TABLE 3A

| Switch Device | S101 | S102 | S103 | S104 | S100 |
|---|---|---|---|---|---|
| Work Status | ON | ON | ON | OFF | ON |

TABLE 3B

| Switch Device | S101 | S102 | S103 | S104 | S100 |
|---|---|---|---|---|---|
| Work Status | OFF | ON | ON | ON | ON |

TABLE 3C

| Switch Device | S101 | S102 | S103 | S104 | S100 |
|---|---|---|---|---|---|
| Work Status | ON | OFF | ON | ON | ON |

TABLE 3D

| Switch Device | S101 | S102 | S103 | S104 | S100 |
|---|---|---|---|---|---|
| Work Status | ON | ON | OFF | ON | ON |

(4) All energy devices are series connected for maximum voltage output as shown on Table 4. If the voltage of each independent energy storage device is E, then the output voltage is 4E.

TABLE 4

| Switch Device | S101 | S102 | S103 | S104 | S100 |
|---|---|---|---|---|---|
| Work Status | ON | ON | ON | ON | ON |

B. Partial output among the staircase steps:

The specific step voltages may be selected subject to requirements other than those of equi-potential steps by varying the timing or sequence switching between the steps.

Figure 2:
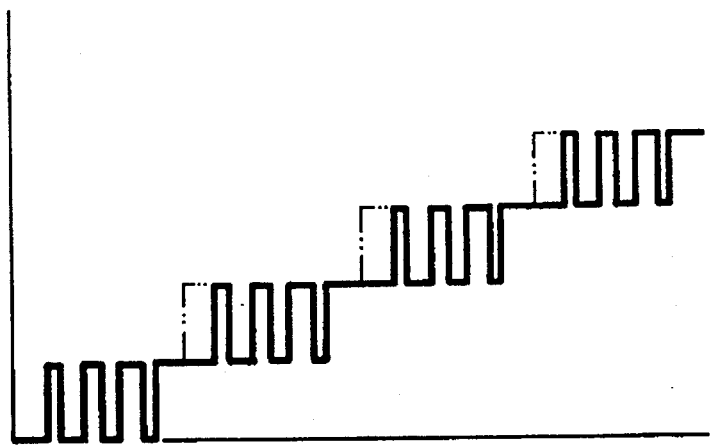
FIG. 2 is a waveform diagram showing a pulse width modulated staircase voltage output according to a first preferred embodiment of the present invention.

C. Staircase voltage with pulse width modulation:

Referring to FIG. 2, pulse width modulation allows a continuous variable output ranging from zero to the maximum voltage output. This is accomplished by switching between adjacent steps in order to obtain a mean value for output. Referring to FIG. 1, which illustrates the embodiment having four energy storage devices, the relationship between the lowest step voltage, which all storage devices are parallel connected, and the second lowest step voltage, in which pairs of the energy storage devices are parallel connected, as shown in Tables 1 and 2, is varied by sequencing the cycles in which the solid state switch devices are turned ON and OFF, such that the higher percentage of time at which the status shown in Table 1 is present, the closer the voltage is to the lowest voltage stage, and the higher percentage the system has the status shown in Table 2, the closer the voltage is to the second lowest voltage stage.

Variation of the stepped cycle can easily be executed by the central control unit (CCU) in accordance with instructions from the control interface and built-in data, or by an output control reference using a feedback detector including load current and voltage, etc. The solid state switch devices may be manually controlled or driven by a drive circuit controlled by an electric interface.

Figure 3:
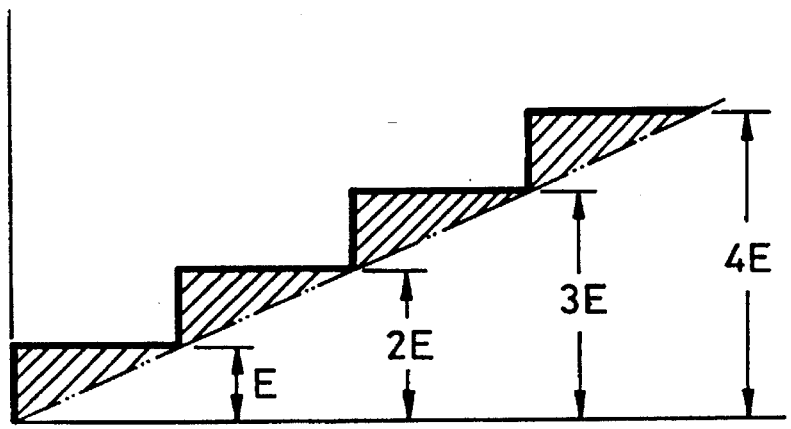
FIG. 3 is a waveform diagram showing an analog modulated staircase voltage output according to a second preferred embodiment of the present invention.

D. Staircase voltage with analogic modulation for a linear output:

Referring to FIG. 3, each output can easily be adjusted from a higher stepped voltage by linearly adjusting solid stage linear element S100 in order to connect voltage values between adjacent steps.

E. Partial output of each continuous output:

The sequence of output steps can be varied subject to requirements other than that of a continuous output ranging from zero to the map mum voltage value.

By analogy to conventional power supply units, the pulse width ratio obtained by the preferred embodiment can be regulated by virtue of output end voltage and output current value measuring, and further like the conventional power supply units, can have a constant voltage or limiting voltage, and constant current or limiting current, function.

Figure 4:
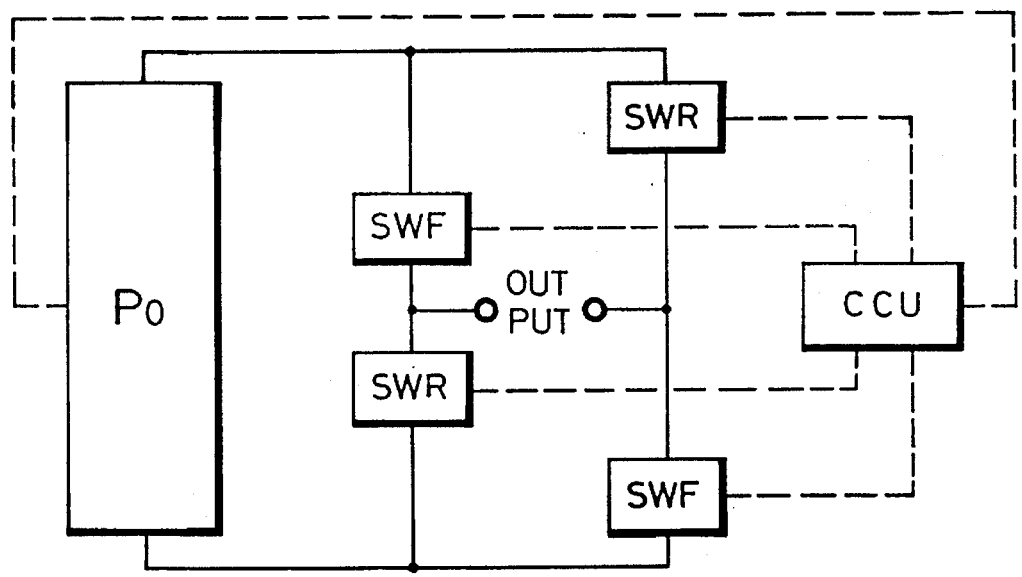
FIG. 4 is a block diagram showing a DC-to-AC approximated sine wave output circuit made up of bridge-type switches and a staircase generator of the type shown in FIG. 1 according to another preferred embodiment of the present invention.

The stepped voltage control circuit as described above, in addition to being directly connected to the load, may be further combined with a bridge type switch device for approximating an AC sine wave output in a manner analogous to the conventional single DC to AC converter, and thus this feature will not be described in detail herein. However, the present invention can also be, combined with a conventional bridge type switch circuit for making a specific multi-step compound voltage which directly approximates an AC sine wave output to take the place of high-cost low-efficiency conventional conversion means based on a number of inverters and interconnected transformers. The construction and operation/control of this embodiment, which includes both a bridge type switch circuit and a stepped voltage synchronous operation/control is shown in FIG. 4, and includes a commutating circuit made up of four bridge-connected switch devices SWR and SWF in the form of thyristors, power transistors, or electromechanical switch devices, the output ends of which are parallel connected to the load and the input ends of which are connected to the battery set, or to another energy storage device or staircase voltage control circuit P0 made up of plural independent DC power supplies. Circuit P0 and the bridge type switch device made up of switches SWF and SWR are controlled by a digital logic type or analog type central control unit CCU to enable positive current to pass by the load when two switch devices SWF are ON, and to enable negative current to pass by the load when the other two switch devices SWR are ON in order to provide a cycle alternating function.

During each cycle, the compound power supply is caused to cycle through the steps described above from zero through low to high and back to low and to zero, changing direction to repeat the voltage cycle with an opposite polarity in order to obtain an approximated sine wave output.

Figure 5:
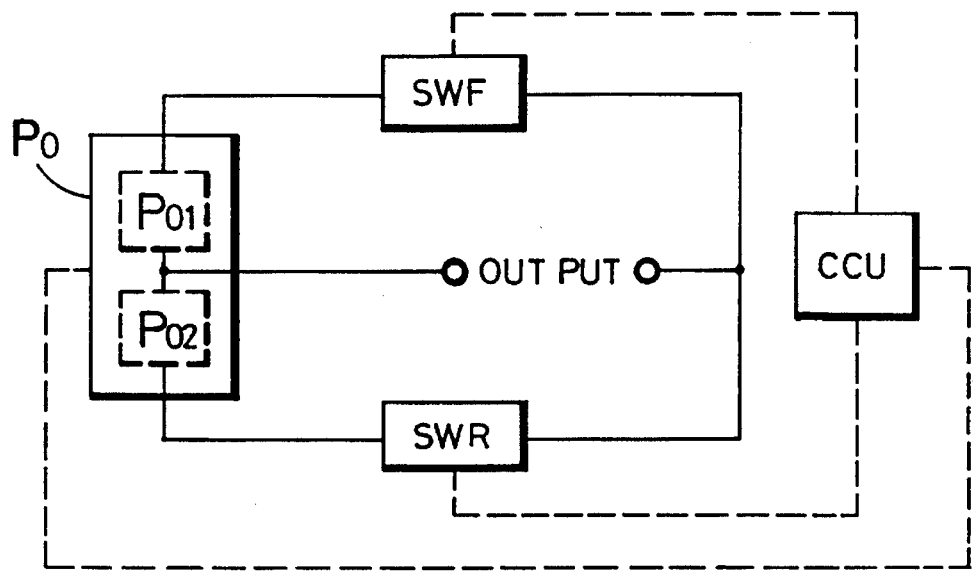
FIG. 5 is a block diagram showing a DC-to-AC approximated sine wave output circuit formed by alternative selection of dual series connected power supplies of the type shown in FIG. 1 according to yet another preferred embodiment of the present invention.
Figure 6:
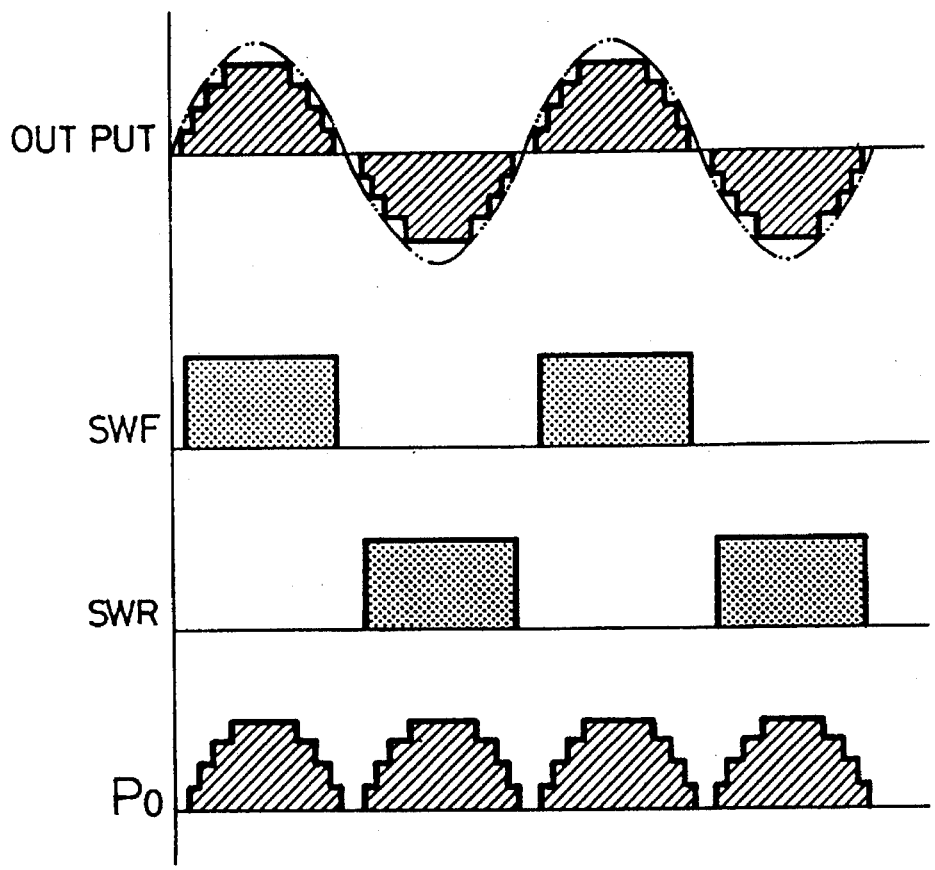
FIG. 6 is a waveform diagram for the embodiment of FIG. 4.

The above circuit may also be bridge type circuit (FIG. 5 consisting of plural power elements series connected by an intermediate series tap and two switch devices, i.e., P0 may include a first power supply $P_{01}$ and a second power supply $P_{02}$ connected positively in series with the first power supply $P_{01}$, and the bridge type switch device may be made up of two switches, with switch SWF connected in series with the positive end of the power supply and switch SWR connected in series with the negative end of power supply, the other end of the two switch devices leading to the other end of load, and the load voltage polarity can be alternated by virtue of alternating the two switch devices ON OFF, in conjunction with cycling of each DC staircase voltage power supply through half cycles from low to high and high to low, to form an approximated sine wave output. The resulting waveforms for the embodiment of FIG. 4 are shown in FIG. 6, with the diagram for the embodiment of FIG. 5 being similar except that alternate cycles for P0 may be labelled $P_{01}$ and $P_{02}$.

The preferred circuit may be modified to have a polyphase output by providing plural circuits of the above-described monophase approximated sine wave forming inverter. In other words, respective bridge type switch devices may be included for coupling different staircase voltage power supplies to the output end, under the control of phase-difference instructions given from he CCU.

Depending on the load requirements, the power wave form in general may include triangular waveforms, square waveforms, concave waveforms, differential waveforms, integral waveforms, each of which has a respective purpose. A DC pulse output can be achieved by direct control of the CCU of he staircase voltage output procedures for making approximate waveforms as required, an AC output can be obtained by synchronous matching of polarity exchange bridge type circuits, or the output waveform can be trimmed by virtue of a series connected linear switch device.

Figure 13:
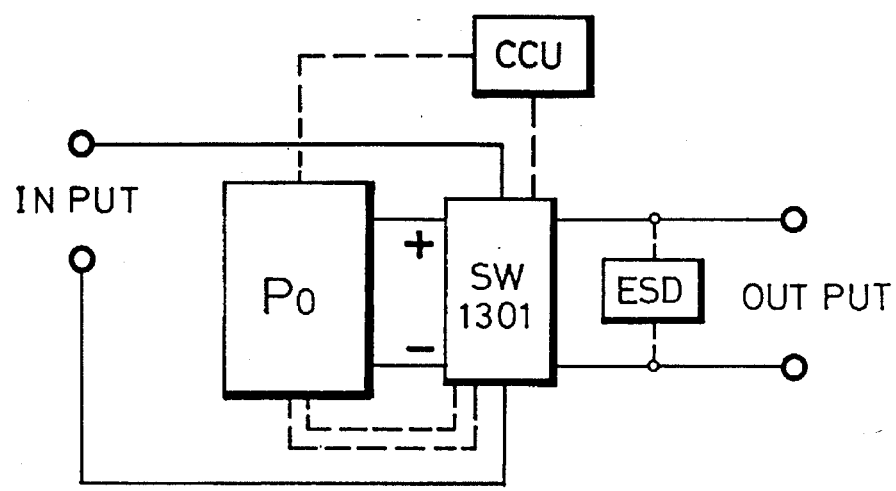
FIG. 13 is a block diagram showing an electric energy converting circuit which includes a voltage controller of the type shown in FIG. 1 and which is capable of operating according to any of the cycles shown in FIGS. 7–12.

In addition to serving as a power supply, the above-described power supply $P_0$ can be adapted, as those skilled in the art will appreciate, for power storage, by providing series/parallel control elements for the power unit $P_0$ shown in FIG. 13, in the form of bilateral conductive elements, and solid state switch devices which enable the voltage step control properties of the preferred control circuit to enable a battery set, other energy storage device, or plural independent DC power supplies to be adjustably coupled with an external input or stored electric energy for adjustment.

Figure 7:
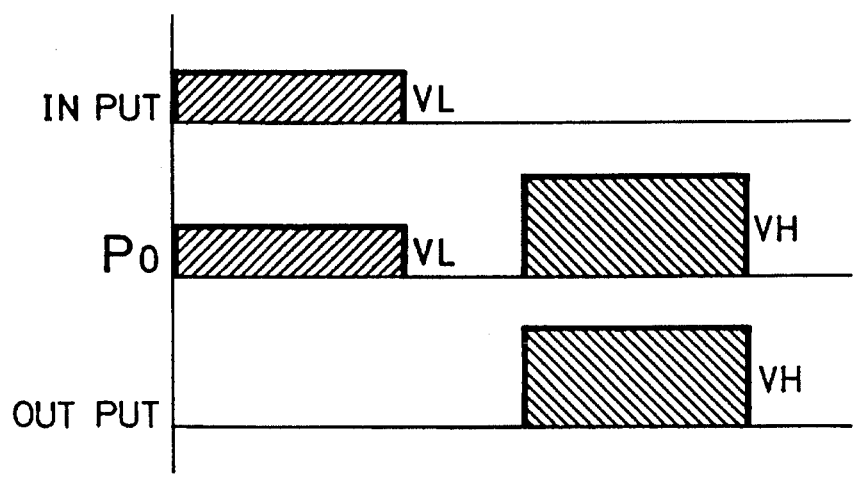
FIG. 7 is a diagram showing a low voltage charge and high voltage discharge operating cycle for a power supply of the type shown in FIG. 1 according to a further preferred embodiment of the present invention.

Further, using the circuit of FIG. 13, the power unit $P_0$ may accept the input/output of different voltages by virtue of changes in the status of staircase voltage in order to form a DC-to-DC transformer or recycling dynamic feedback controlled collector for power generation by the load. The duty cycle possibilities for the power unit $P_0$, connected as shown in FIG. 13, include:

(1) Low voltage status for input and conversion to a high voltage output as shown in FIG. 7.

Figure 8:
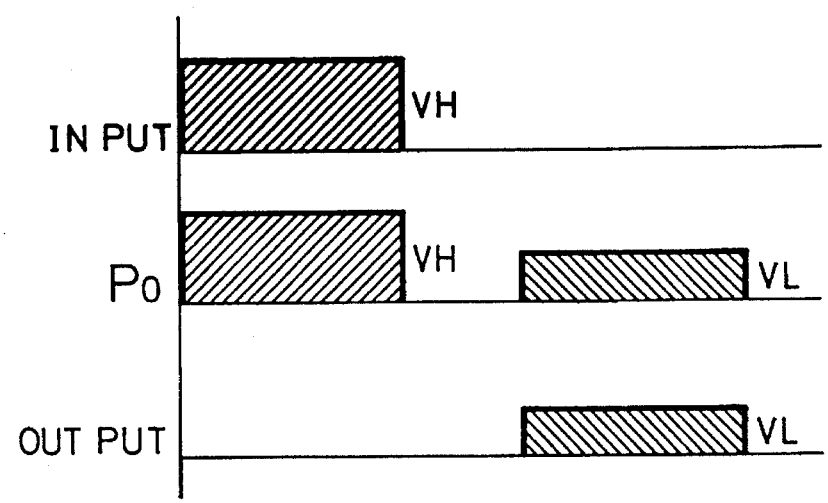
FIG. 8 is a diagram showing a high voltage charge low voltage discharge operating cycle for a power supply of the type shown in FIG. 1 according to a variation of the embodiment illustrated in FIG. 7.

(2) High voltage status for input and conversion to a low voltage output, as shown in FIG. 8.

Figure 9:
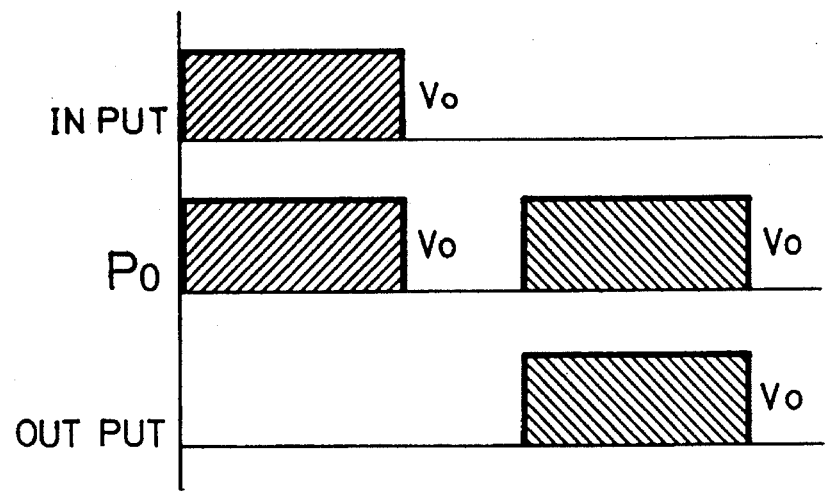
FIG. 9 is a diagram showing an equal voltage operating cycle for isolation for a voltage controller of the type shown in FIG. 1 according to a still further embodiment of the present invention.

(3) Same voltage input and output to isolate the input end from output end, as shown in FIG. 9.

Figure 10:
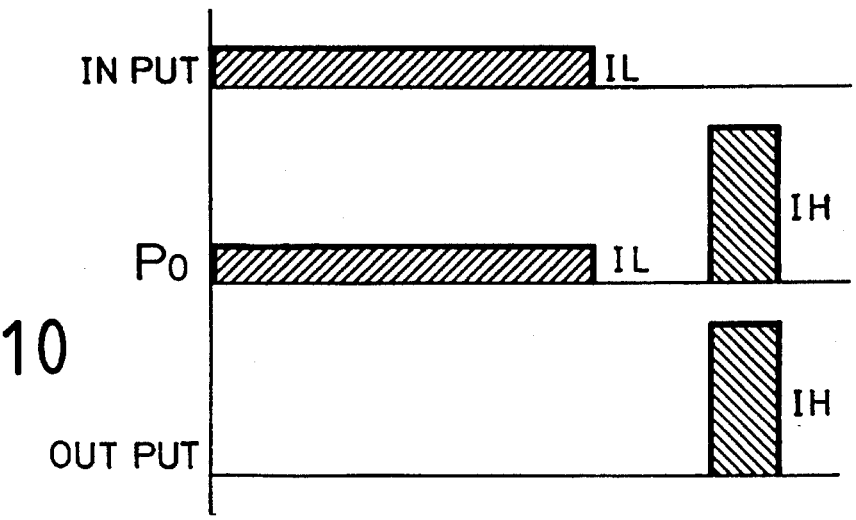
FIG. 10 is a diagram showing a small-circuit charge and large-current discharge operating cycle for the voltage controller circuit of FIG. 1 according to an additional embodiment of the present invention.

(4) Long duration small current input and short duration large current output to form an instantaneous large input power supply, as shown in FIG. 10.

Figure 11:
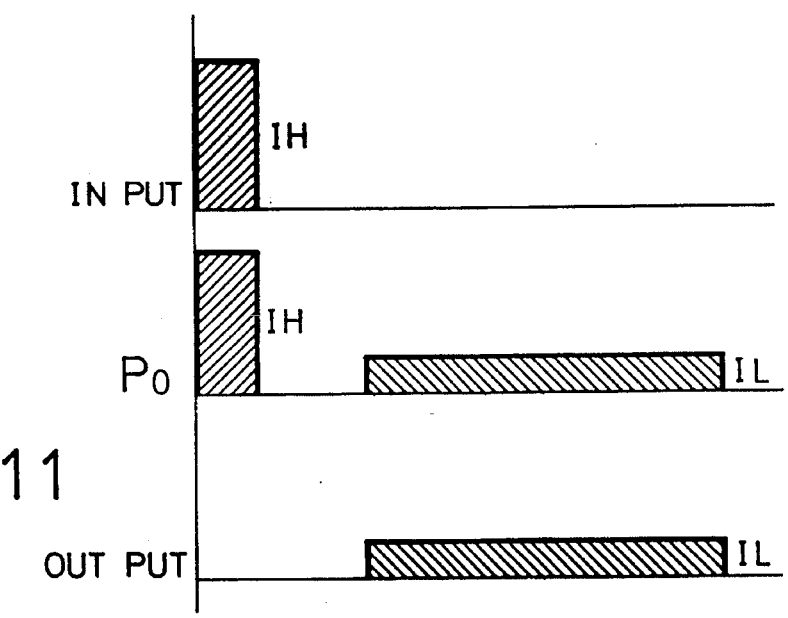
FIG. 11 is a diagram showing a large-current charge and small-current discharge operating cycle for the voltage controller circuit of FIG. 1 according to a variation of the embodiment shown in FIG. 10.

(5) Short duration large current input and long duration small current output to store power within a short time for long duration and lower power consumption, as shown in FIG. 11.

Figure 12:
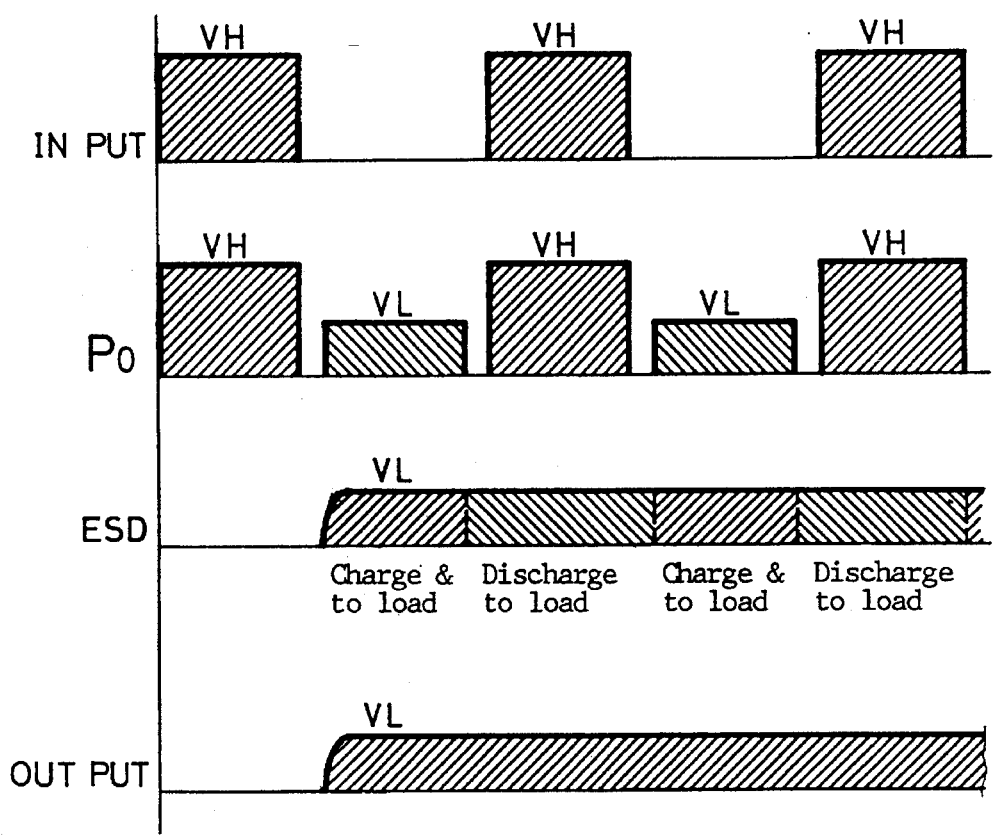
FIG. 12 is a diagram showing a constant voltage output cycle obtained by including an electric energy storage device at the output end of a device which includes the voltage controller of FIG. 1 according to a final preferred embodiment of the present invention.

(6) An electric energy storage unit such as a battery or capacitance for alternating DC input/output cycle alternating operation can be added, and a corresponding load connected in parallel to the capacitance or battery, for power storage to enable the output to be available for continuous power supply, as shown in FIG. 12.

(7) Finally, a bridge type switch circuit may be added to provide an AC output, as already described above in connection with FIGS. 4–6, in conjunction with a DC input.

In each of the above cases, the output side of the circuits may be stabilized by an energy storage device connected in parallel with the output.

FIG. 13, discussed briefly above, shows an electric energy converting circuit for providing the various functions shown in FIGS. 7–12, utilizing an addition electric energy storage device mounted at the output side of a circuit staircase generator of the type shown in FIG. 1. The circuit of FIG. 13 includes a power supply P0 made up of a staircase voltage generator having bilateral series/parallel switches as described above in connection with FIG. 1, and a bilateral distribution control switch SW1301 connected in series between the load end and input end. Switch SW1301 is made up of electromechanical or solid state elements controlled by a digital logic type or analog type control unit to connect the input end to power supply P0 for charging $P_0$; to connect the load end for electric energy feedback to the power unit $P_0$; and to directly connect the input end with the load end under special conditions.

Figure 14:
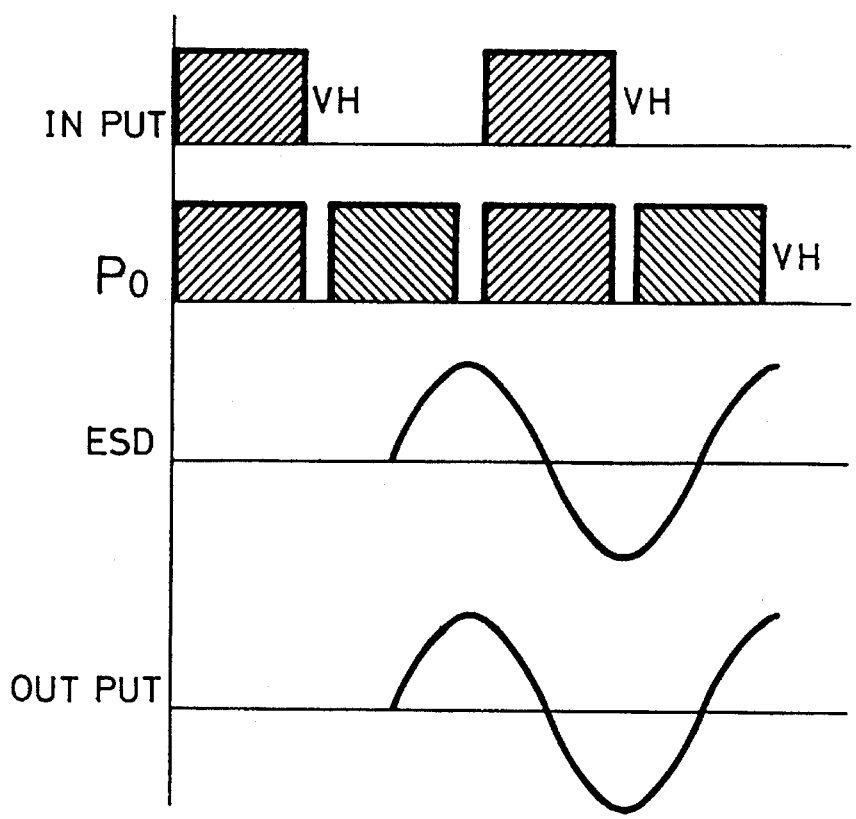
FIG. 14 is a diagram illustrating an application of the circuit of FIG. 13 in which an inductance and capacitance are connected in parallel with an AC load.

In the case of a DC load, an energy storage device ESD such as a battery or capacitor may be added. In the case of an AC load, a parallel oscillating energy storage device ESD made up of an inductance L and capacitor C may be added, such that the output status of the AC energy storage device is as shown in FIG. 14.

Figure 15:
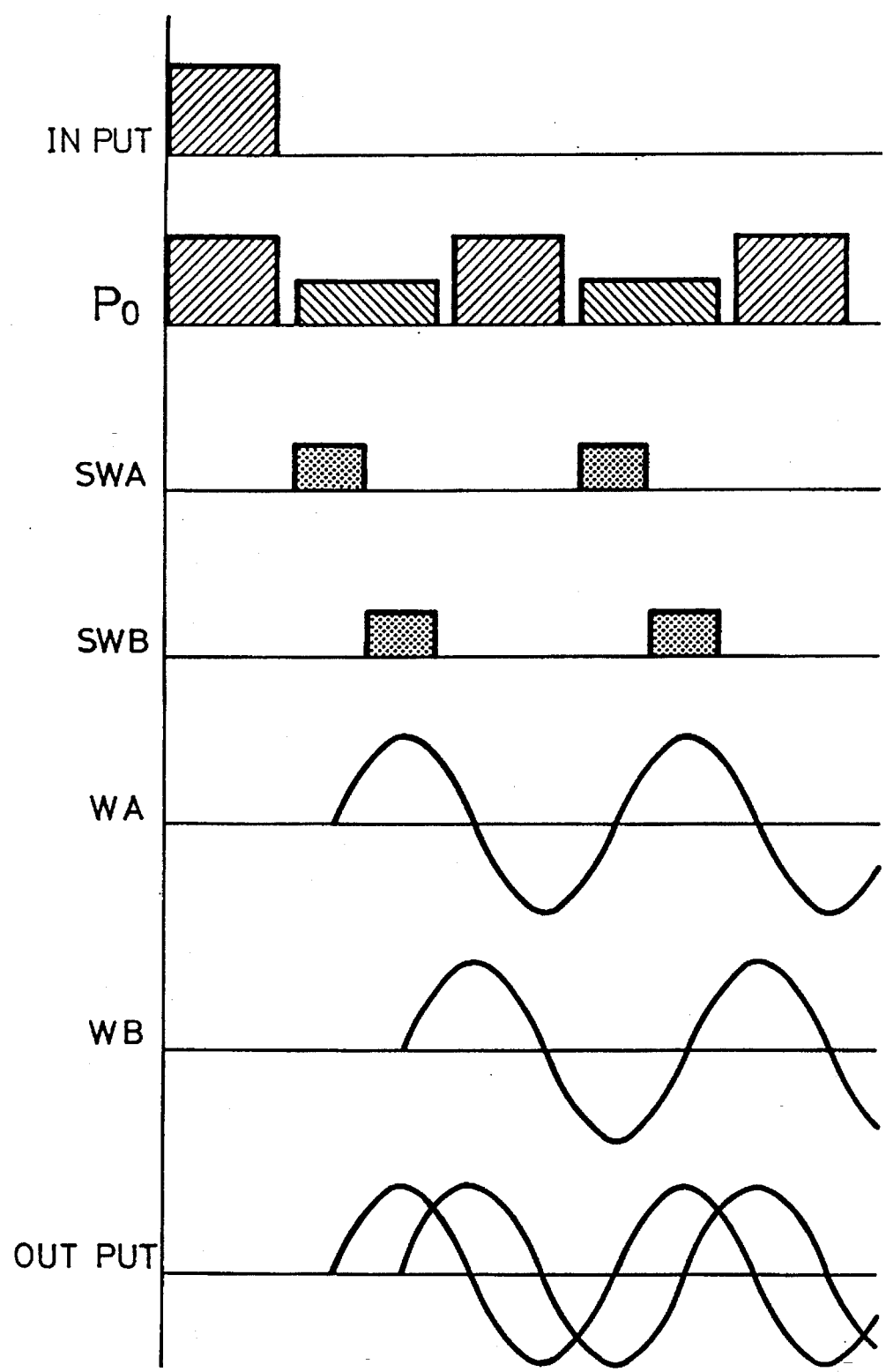
FIG. 15 is a diagram shows a variation of the embodiment of FIG. 14 in which both the output sides of the preferred voltage controller are parallel connected with an inductance and capacitance to obtain phase shifted outputs.

Finally, the polyphase output of the above-mentioned circuits is achieved by plural switches respectively coupling between each energy storage device and power unit $P_0$, with each switch device turned on in sequence according to a different cycle to enable the voltage wave form of each energy storage inductance L and capacitor C to be different in phase, as shown in FIG. 15.

I claim:

1. A voltage controller circuit, comprising:

first and second output terminals;

at least three energy storage devices;

at least three solid state switch devices respectively connected in series between a first said energy storage device and a second said energy storage device, between the second said energy storage device and a third said energy storage device, and between the third said energy storage device and the second output terminal of the controller;

driver circuit means for switching said solid state switch devices on or off to respectively series connect said first energy storage device to said second energy storage device, said second energy storage device to said third energy storage device, and said third energy storage device to the second output terminal;

a general control solid state switch connected in series between the first output terminal and the first said energy storage device;

a first diode connected in parallel with said series connected first energy storage device and first solid state switch device, a second diode connected in parallel with said series connected second energy storage device and second solid state switch device, a third diode connected in parallel with said series connected first solid state switch device and second energy storage device, and a fourth diode connected in parallel with said second solid state switch device and third energy storage device, and means for controlling said switches to alternately select one of at least three output voltage levels to form a pulse width modulated staircase voltage, wherein the first voltage step is obtained by opening each of said solid state switch devices to initially connect each of the energy storage devices in parallel through said diodes, subsequently disconnecting said energy storage devices from the output terminals by opening the general control solid state switch, and then repeatedly closing and opening the general control solid state switch to connect and disconnect the parallel connected energy storage devices to and from the output terminals to obtain a pulse train the height of which is the height of said first voltage step, the second voltage step is obtained by initially opening one of said solid state switch devices to series-connect two of the energy storage devices so as to obtain a two-fold increase in output voltage, closing said one of said solid state switch devices to disconnect the two energy storage devices from each other, and then repeatedly opening and closing said one said solid state switch devices to obtain a train of pulses the bases of which are at the level of said first voltage step and the peaks of which form said second voltage step, and the third voltage step is obtained by closing each of said solid state switch devices to connect three of the energy storage devices in series so as to obtain a three-fold increase in voltage, opening all but said one of said solid state switch devices which connects two of the energy storage devices in series, and then repeatedly opening and closing said all but said one of said solid state switch devices to form a train of pulses the base of which is at said second voltage step and the peaks of which form said third voltage step.

2. A circuit as claimed in claim 1, wherein said solid state switch device is a linear device for causing the voltage in each of the steps to increase linearly.

3. A circuit as claimed in claim 1, wherein a number of said at least three storage devices is four, a number of said at least three solid state switch devices is four, and a number of said output voltage levels is therefore also four.

4. A voltage controller circuit comprising:

first and second output terminals;

at least three energy storage devices;

at least three solid state switch devices respectively connected in series between a first said energy storage device and a second said energy storage device, between the second said energy storage device and a third said energy storage device, and between the third said energy storage device and the second output terminal of the controller;

driver circuit means for switching said solid state switch devices on or off to respectively series connect said first energy storage device to said second energy storage device, said second energy storage device to said third energy storage device, and said third energy storage device to the second output terminal;

a general control solid state switch connected in series between the first output terminal and the first said energy storage device;

a first diode connected in parallel with said series connected first energy storage device and first solid state switch device, a second diode connected in parallel with said series connected second energy storage device and second solid state switch device, a third diode connected in parallel with said series connected first solid state switch device and second energy storage device, and a fourth diode connected in parallel with said second state switch device and third energy storage device, means for controlling said switch devices to select one of at least three output voltage steps to form a staircase voltage by opening selected ones of said switch devices to initially connect each of the energy storage devices in parallel, to then series-connect two of the energy storage devices so as to obtain a two-fold increase in output voltage, and to then connect three of the energy storage devices in series so as to obtain a three-fold increase in voltage, and means for varying a timing of said output voltage steps to form a half-wave output, the voltage controller increasing the voltage level supplied to said terminals in steps from zero to a high level, and then decreasing it back to zero.

5. A circuit as claimed in claim 4, further comprising bridge circuit means for alternately connecting said output terminals to opposite poles of an output terminal in order to form an approximated sine wave.

6. A circuit as claimed in claim 4, further comprising a second controller, each controller forming half-wave outputs, and switch means for alternately connecting and disconnecting one output terminal of each of the controllers, the other output terminal being connected at a center tap between the two controllers to form an approximated sine wave.

7. A voltage controller circuit, comprising:

first and second output terminals;

at least three energy storage devices;

at least three solid state switch devices respectively connected in series between a first said energy storage device and a second said energy storage device, between the second said energy storage device and a third said energy storage device, and between the third said energy storage device and the second output terminal of the controller;

driver circuit means for switching said solid state switch devices on or off to respectively series connect said first energy storage device to said second energy storage device, said second energy storage device to said third energy storage device, and said third energy storage device to the second output terminal;

a general control solid state switch connected in series between the first output terminal and the first said energy storage device;

a first diode connected in parallel with said series connected first energy storage device and first solid state switch device, a second diode connected in parallel with said series connected second energy storage device and second solid state switch device, a third diode connected in parallel with said series connected first solid state switch device and second energy storage device, and a fourth diode connected in parallel with said second solid state switch device and third energy storage device, and means for controlling said switch devices to select one of at least three output voltage levels to form a staircase voltage by opening selected ones of said switch devices to initially connect each of the energy storage devices in parallel, to then series-connect two of the energy storage devices so as to obtain a two-fold increase in output voltage, and to then connect three of the energy storage devices in series so as to obtain a three-fold increase in voltage, and wherein the controller is connected to voltage input means for permitting a charging input to be applied to the energy storage devices through said terminals.

8. A circuit as claimed in claim 7, wherein an output of the controller is matched to the input.

9. A circuit as claimed in claim 7, further comprising an additional DC energy storage device connected in parallel with the output, said controller being controlled to charge the energy storage device so as to generate a constant output.

10. A circuit as claimed in claim 7, further comprising an LC circuit connected in parallel with the output in order to form an AC output.

11. A circuit as claimed in claim 10, wherein said AC output is phase shifted from a second AC output.

* * * * *